March 16, 1926.
M. H. HILL
1,577,121
AUTOMATIC CONTROL DEVICE
Filed July 27, 1925
2 Sheets-Sheet 1
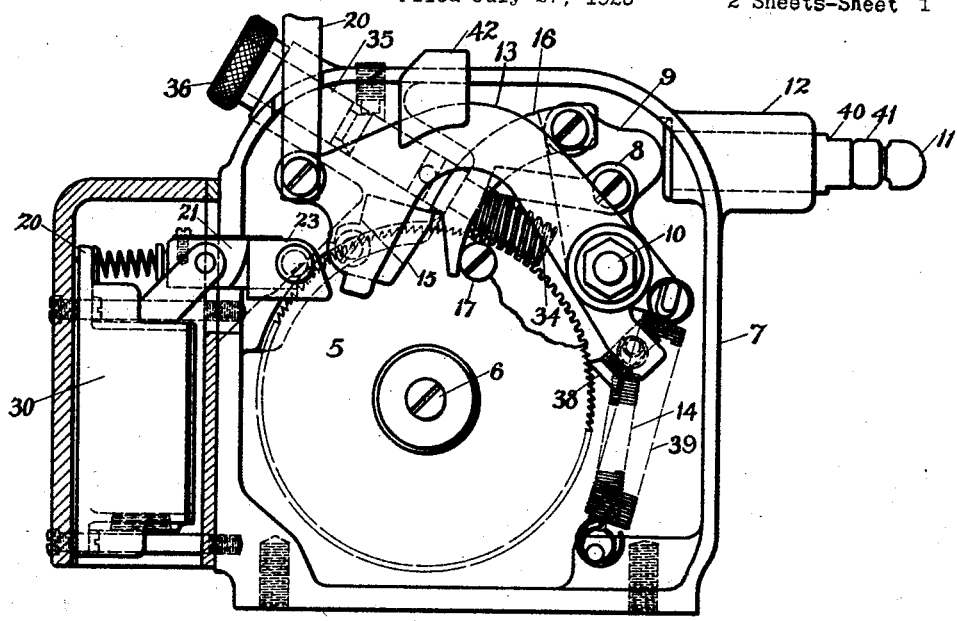
Fig. 1
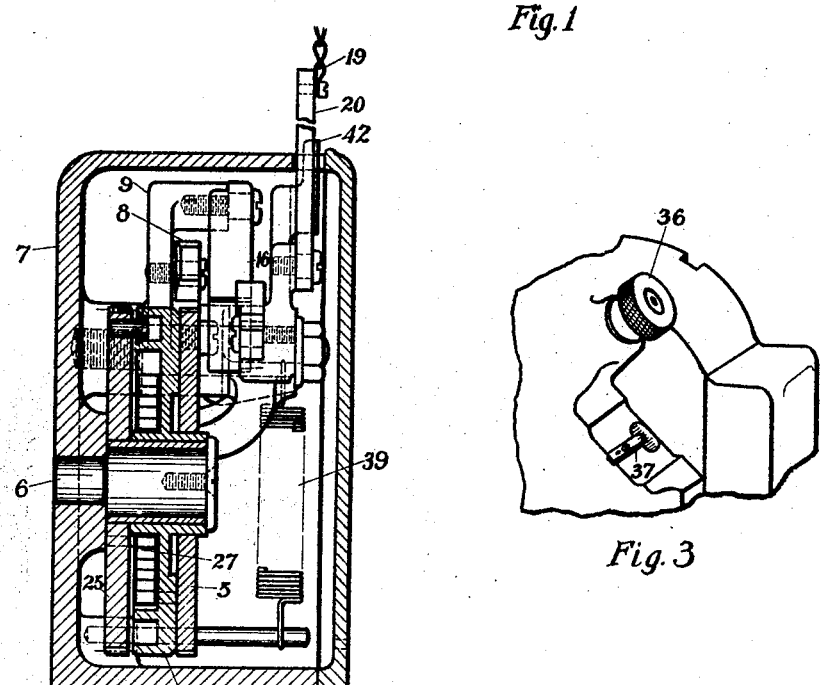
Fig. 2
Fig. 3
Maxwell H. Hill INVENTOR
BY B. Shlesinger
ATTORNEY March 16, 1926.

M. H. HILL 1,577,121

AUTOMATIC CONTROL DEVICE

Filed July 27, 1925    2 Sheets-Sheet 2

Maxwell H. Hill   INVENTOR

BY
ATTORNEY

Patented Mar. 16, 1926.

1,577,121

UNITED STATES PATENT OFFICE.

MAXWELL H. HILL, OF ROCHESTER, NEW YORK, ASSIGNOR TO GLEASON WORKS, OF ROCHESTER, NEW YORK, A CORPORATION OF NEW YORK.

AUTOMATIC CONTROL DEVICE.

Application filed July 27, 1925. Serial No. 46,387.

*To all whom it may concern:*

Be it known that I, MAXWELL H. HILL, a citizen of the United States, residing at Rochester, in the county of Monroe and State of New York, have invented a certain new and useful Improvement in Automatic Control Devices, of which the following is a specification.

The present invention relates to an automatic control mechanism for machine tools.

The primary object of the invention is to provide a control device which will be simple in operation, cheap to construct, and easy to keep in order.

A further purpose of the invention is to provide a control device which can be set to operate after any determined number of minor operations of the machine tool upon which the control device is employed.

A further purpose of the invention is to provide a control device which may not only be initially set to operate after a determined number of minor operations of the machine tool upon which the control device is employed, but which will also automatically reset itself.

Further objects of the invention will be apparent hereinafter from the specification and the claims.

While I have illustrated in the drawings appended hereto one preferred embodiment of my invention, it will be understood that the invention is capable of further modification within the limits of the disclosure and the scope of the appended claims.

In the drawings:

Fig. 1 is a section through the casing of a control device constructed according to this invention, showing the operating parts in side elevation;

Fig. 2 is a sectional view taken generally at right angles to Fig. 1;

Fig. 3 is a fragmentary perspective view, showing a portion of the exterior of the casing;

Figure 4:
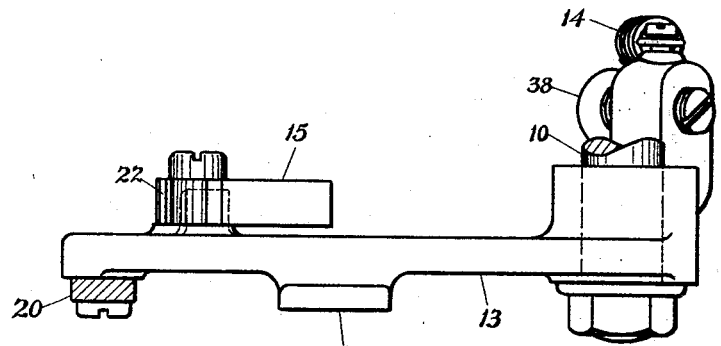
Fig. 4 is a detail, showing in plan, certain of the parts.
Figure 5:
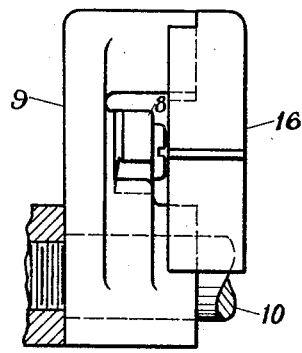
Fig. 5 is a detail, showing in front elevation, the pawl carrier and the parts carried thereby.
Figure 6:
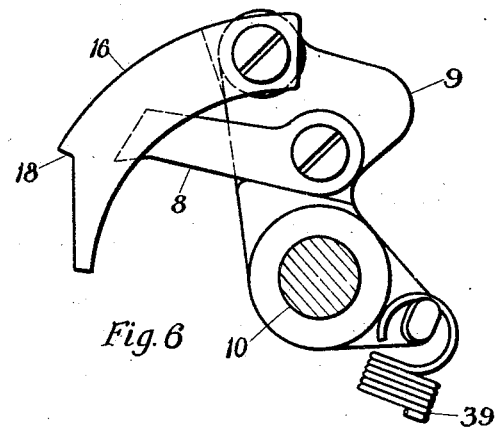
Fig. 6 is a side elevation of the parts shown in Fig. 5.
Figure 7:
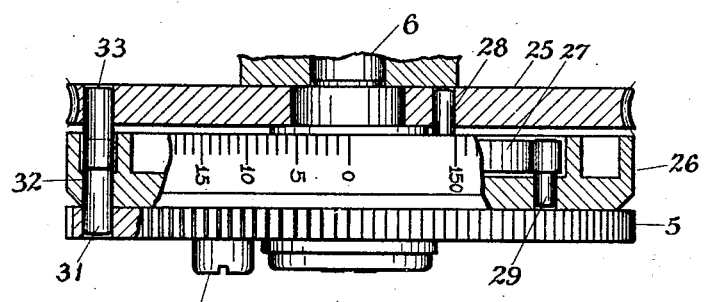
Fig. 7 is a plan view, partly in section, showing the setting gear, indicator dial, and ratchet wheel, and the connections therebetween.

The present invention relates to a control device of that type which includes as its basic element a member which has an operative connection with the machine tool upon which the control device is employed. The basic element is advanced step by step with each minor operation of the machine tool until it reaches a position where the work having been completed, it acts to vary or completely stop the motion of the machine tool. The device of this invention is primarily intended for use on gear cutting machines and it includes a device which is advanced step by step as each tooth of the blank is cut until it reaches a position, determined by the number of teeth to be cut on the blank, when through its operative connection with the machine, it will cause the machine to be stopped.

Referring to the drawings by numerals of reference, I have shown a ratchet wheel 5 rotatably mounted upon the stud 6 secured to the casing 7. This ratchet wheel is adapted to be advanced one or more notches with each minor operation of the machine tool to which the control device is secured. A pawl 8 pivotally mounted on a pawl carrier 9, which is itself, pivotally mounted on the stud 10 secured to the casing, is employed to periodically advance the ratchet wheel. Any suitable means may be employed for rocking the pawl carrier 9 about its pivot 10 to bring the pawl 8 into engagement with the ratchet wheel to advance the same. As shown, this means comprises a plunger 11 which is slidably mounted in a sleeve 12, preferably, formed integral with the casing 7. The plunger is operatively connected with a moving part of the machine tool and is adapted to be reciprocated in its sleeve with the completion of each minor operation of the machine tool to contact with the pawl carrier and to rock the same about its pivot 10. The connection between the plunger and the machine tool may be of any desired nature and is not shown here as it forms no part of my invention.

Pivotally mounted on the stud 10 along side the pawl carrier 9 is a lever arm 13.

The lever arm is normally held in the position shown in Fig. 1 by a spring 14 which is secured at one end to the arm and at the other end to the casing. A catch 15 is pivotally secured to the lever arm 13 adjacent one end thereof. A trip arm 16, which in the preferred embodiment of my invention, is pivotally secured to the pawl carrier 9, is adapted to engage the catch 15 on the lever arm 13, when the ratchet wheel has been advanced to a predetermined position, to rock the lever arm 13 about the pivot 10. For actuating the trip arm 16 into engagement with the catch 15 on the lever arm 13 a pin 17 is provided. This pin is secured to the ratchet wheel so as to move therewith. When the ratchet wheel has been advanced far enough the pin 17 will engage the lower end of the trip arm 16 moving the latter about its pivot until the portion 18 engages the catch 15. This position is shown in Fig. 1. On the next movement of the plunger 11 and of the pawl carrier 9 the trip arm will force the lever 13 down against the action of the spring 14. This movement of the lever arm is employed to effect a change in operation of the machine.

This movement of the lever arm may be utilized mechanically or electrically. A chain, shown at 19 may be connected directly to or by a link 20 with the movable member 13. The chain can be used to control a belt shifting device or other mechanism to automatically stop the machine or to otherwise change the operation of the machine. Instead of a chain connection any suitable type of linkage may be employed for the same purpose. The movable member 13 may also if desired, be used to control the operation of the machine through some electrical device such as the limit switch 30. In the embodiment shown the limit switch is thrown by the catch 15. To insure sufficient time for the stopping of the machine after the completion of the operations on the work, where the control device is used to actuate an automatic stop mechanism, I have found it preferable to so arrange the parts that the switch 30 will be thrown on the return movement of the lever 13 under actuation of the spring 14 instead of on the downward movement under actuation of the trip arm 16. To accomplish this, the arm 21 of the limit switch carries a lug 23 which is pivoted on the arm for movement in one direction only. The catch 15 is provided on its rear end with a notch 22. On the down stroke of the lever 13 the catch rocks the lug 23 about its pivot 24 without moving the arm of the switch. On the return stroke of the lever 13 under actuation of the spring 14, the notch 22 on the catch 15 engages the lug 23 and thus throws the switch.

Ordinarily the control device of this invention will be so designed as to operate either through a mechanical connection or an electrical connection. For the purpose of illustrating the manner in which this invention operates, however, I have shown both a mechanical connection 20 and an electrical connection 30 between the control device and the machine.

As already stated, the control device of this invention will preferably be so constructed that it may be set to operate after the completion of any desired number of operations of the machine. In the preferred embodiment of the invention, the means for accomplishing this include a gear 25, an indicator dial 26, and a coil spring 27. The spring 27 is connected at one end by the pin 28 with the gear 25 and at the other end with the indicator dial by the pin 29. A pin 31 secured to the ratchet wheel 5 and inserted in an aperture 32 in the indicator dial serves to connect the ratchet wheel and dial for movement together. The gear wheel is provided with a stop 33 and the spring 27 is so arranged as to constantly urge the pin 31 to return to the stop 33. This arrangement is employed for setting the ratchet wheel initially and for insuring its return to its initial setting after each operation of the control device.

To set the ratchet wheel initially the gear wheel 25 may be rotated by a worm 34 mounted on a spindle 35 which is journaled in the casing and which is provided at its outer end with a knurled nut 36 by means of which the worm may be rotated. When the gear wheel is rotated the spring 27 forces the indicator dial and the ratchet wheel to follow it, as already described. The indicator dial may be provided with any suitable graduations which may be read against the index pointer 37 on the casing. In a gear cutting machine the ratchet wheel will be set according to the number of teeth which are to be cut upon the blank.

As previously stated the ratchet wheel is advanced step by step by means of the pawl 8. To retain the ratchet wheel in its advanced position against the action of the coil spring 27, the dog 38 is provided. This dog may be an ordinary screw which is threaded into the lever arm 13 adjacent one end. The dog 38 is normally retained in position by the spring 14.

If desired the plunger 11 may be threaded to adjustably carry a nut 40 and a lock-nut 41. By adjusting these nuts the stroke of the plunger can be adjusted so that it will move the pawl carrier 9 a distance which will advance the ratchet wheel one or more teeth as desired at each stroke of the plunger. The spring 39 which is secured to the pawl carrier 9 at one end and to the casing 7 at the other end serves to hold the pawl normally out of engagement with the ratchet wheel. This spring is strong enough to return the plunger 11 to the position shown in Fig. 1 after each stroke.

The operation of the device is as follows: The ratchet wheel will be initially set by the worm 34 and worm wheel 25. Each time the machine tool completes a minor operation, as the cutting of a tooth or the boring of a hole, some movable part of the machine, as a lug on a reciprocating or oscillating bed, will move the plunger 11. The plunger will rock the pawl carrier 9 about its pivot 10 and actuate the pawl 8 into engagement with the ratchet wheel 5 to advance the same one or more notches. As the ratchet wheel moves the pin 17 moves with it. When the ratchet wheel has advanced to the position shown in Fig. 1, the pin 17 will contact with the trip arm 16 and force the same into engagement with the catch 15 secured to the lever 13. On the next stroke of the plunger 11, the rocking of the pawl carrier 9 will force the lever arm 13 down against the action of the spring 14. When the lever arm is rocked down the dog 38 releases the ratchet wheel and a coil spring returns the ratchet wheel to its initial setting which is determined by the position of the stop 33 on the gear wheel 25. When the lever arm is rocked down it also pulls down the link 20 and chain 19. Where the electrical connection is employed, as already explained, the limit switch is thrown on the return of the lever arm to normal position under actuation of the spring 14.

In changing the setting of the ratchet wheel and dial, occasion sometimes arises for changing from a lower to a higher setting. Where this is done it has been found best in practice to set a little beyond the desired mark on the dial and position the ratchet wheel accurately by returning the pin 31 against the stop through actuation of the coil spring 27. To allow the coil spring to act the dog 38 can be released from the ratchet wheel by pushing down the lever 13. A lug 42 is provided on the lever arm 13 for this purpose. This lug projects through an opening in the casing and the lever arm can be manually operated by pushing on this lug.

While I have illustrated a preferred embodiment of my invention, it will be understood that the invention is capable of further modification within the limits of the disclosure and the scope of the appended claims. This application is intended to cover any variations, uses, or adaptations of my invention, following, in general, the principles of the invention and including such departures from the present disclosure as come within known or customary machine shop practice and as may be applied to the essential features hereinbefore set forth and as fall within the limits of the appended claims.

Having thus described my invention, what I claim is:

1. In an automatic control device, a ratchet wheel, indicating means, means for initially setting said ratchet wheel thereby, a pawl for advancing said ratchet wheel, a movable member, a trip means connected to said pawl for movement therewith and means carried by the ratchet wheel for actuating said trip means into engagement with said movable member to move the same when the ratchet wheel reaches a position determined by its initial setting.

2. In an automatic control device, a ratchet wheel, a pawl carrier, a pawl mounted on the carrier and adapted to advance said ratchet wheel, a trip arm pivotally mounted on the pawl carrier for movement therewith, a movable member, a catch on said movable member, and means fixed to the ratchet wheel for actuating said trip arm into engagement with said catch when the ratchet wheel has been advanced to a predetermined position.

3. In an automatic control device, a ratchet wheel, a gear member, a stop on the gear member, a projection on the ratchet wheel, a coil spring connecting the gear member and ratchet wheel and urging the projection on the ratchet wheel to return to said stop, indicating means, means for moving said gear member to initially set said ratchet wheel, a pawl for advancing said ratchet wheel, a dog for retaining said ratchet wheel in its advanced position, a movable member, and means adapted to move said movable member when the ratchet wheel has been advanced to a position determined by its initial setting, said movable member and dog being operatively connected whereby the movable member is actuated and the dog released simultaneously.

4. In an automatic control device, a ratchet wheel, an indicator dial connected to said ratchet wheel, means for initially setting said ratchet wheel, means urging said ratchet wheel and indicator dial to return to their initial setting, a pawl adapted to advance said ratchet wheel, a dog normally holding said ratchet wheel in its advanced position, a trip lever, and means on the ratchet wheel adapted to actuate said trip arm into engagement with said dog to release the same when said ratchet wheel has been advanced to a position determined by its initial setting.

5. In an automatic control device, a ratchet wheel, means for initially setting said ratchet wheel, a coil spring normally urging said ratchet wheel to return to its initial setting, a pawl carrier, a pawl mounted on the carrier, for advancing the ratchet wheel, a movable member, a dog normally holding said ratchet wheel in its advanced position, a trip arm pivotally mounted on the pawl carrier, a catch on the movable member and means on the ratchet wheel for actuating said trip arm into engagement with said catch when the ratchet wheel has been advanced to a position determined by its initial setting.

6. In an automatic control device, a casing, a ratchet wheel rotatably mounted in said casing, an indicator dial connected to said ratchet wheel, a gear member, a stop on the gear member, a spring normally urging the ratchet wheel to return to said stop, means for moving the gear member to initially position said ratchet wheel, a pivotable dog normally holding the ratchet wheel against the action of said spring, means projecting through the casing for rocking said dog, a pawl adapted to advance the ratchet wheel, and means adapted to be actuated into engagement with said dog to release the same when said ratchet wheel has been advanced to a position determined by its initial setting.

7. In an automatic control device, a ratchet wheel, a gear member, a stop on the gear member, a projection on the ratchet wheel, a coil spring connecting the gear member and the ratchet wheel and urging the projection on the ratchet wheel to return to said stop, indicating means, means for moving said gear member to initially set said ratchet wheel, a pawl carrier, a pawl mounted on said carrier for advancing the ratchet wheel, a movable member, means connected to said movable member for normally holding said ratchet wheel in its advanced position, a trip arm pivotally mounted on the pawl carrier, a catch on the movable member and means on the ratchet wheel for actuating said trip arm into engagement with said catch when the ratchet wheel has been advanced to a predetermined position.

8. In an automatic control device, a ratchet wheel, a gear member, a stop on the gear member, a projection on the ratchet wheel, means connecting the gear member and ratchet wheel and urging the projection on the ratchet wheel to return to said stop, means for moving said gear member to initially set the ratchet wheel, a pawl for advancing said ratchet wheel, a movable dog normally holding the ratchet wheel in its advanced position, and means adapted to be actuated when the ratchet wheel has been advanced to a predetermined position to move said dog and release said ratchet wheel.

MAXWELL H. HILL.